United States Patent [19]

Sadowski

[11] Patent Number: 5,239,423
[45] Date of Patent: Aug. 24, 1993

[54] METHOD AND APPARATUS FOR RECOVERING DIGITAL SIGNALS FROM RECORDED REPRODUCTIONS OF DIGITAL SIGNALS

[75] Inventor: Siegbert Sadowski, Irsee, Fed. Rep. of Germany

[73] Assignee: Digital Equipment Corporation, Maynard, Mass.

[21] Appl. No.: 722,046

[22] Filed: Jun. 27, 1991

[30] Foreign Application Priority Data

Jun. 29, 1990 [DE] Fed. Rep. of Germany ....... 4020875

[51] Int. Cl.$^5$ .............................................. G11B 5/09
[52] U.S. Cl. ...................................... 360/46; 360/53; 307/361
[58] Field of Search ................ 360/25, 32, 46, 53; 307/358, 359, 360, 361

[56] References Cited

U.S. PATENT DOCUMENTS

| | | | |
|---|---|---|---|
| 3,518,650 | 6/1970 | Stark | 340/174.1 |
| 4,227,175 | 10/1980 | Newman | 340/146 |
| 4,346,411 | 8/1982 | Buhler et al. | 360/46 |
| 4,837,642 | 6/1989 | Smidth | 360/46 |
| 5,120,985 | 6/1992 | Kimura | 307/358 X |

FOREIGN PATENT DOCUMENTS 59096513 6/1984 Japan .

*Primary Examiner*—Davis Mis
*Attorney, Agent, or Firm*—Barry N. Young; Dirk Brinkman

[57] ABSTRACT

In a method and a circuit arrangement for recovering a digital signal having digital pulses from a recorded signal which is read by a read head of a storage device, the shape of the recorded signal, being a reproduction of the digital signal, is compared with the shape of a normal read signal previously stored as a comparison pattern of voltage values. In the case of agreement, which is given on the presence of a certain correlation, the recorded signal is evaluated as a digital pulse and otherwise on non-agreement as a digital non-pulse.

14 Claims, 4 Drawing Sheets

METHOD AND APPARATUS FOR RECOVERING DIGITAL SIGNALS FROM RECORDED REPRODUCTIONS OF DIGITAL SIGNALS

FIELD OF THE INVENTION

This invention relates to a method and apparatus for recovering digital signals from recorded signals which are reproductions of digital signals and, more particular to a method and circuit arrangement for recovering a digital signal read by a read head of a storage device by comparing the shape of the recorded signal to a level of correlation with the shape of a stored normal read signal as represented by a stored normal read signal comparison pattern.

BACKGROUND OF THE INVENTION

In a mass storage device, information is written onto moving magnetic or optical media as data coded into a series of bits. The bits are then "written" onto the media in the form of magnetically or optically detectable pulse changes in the medium by means of a write head.

For retrieving the recorded information, the data rae read by a read head and decoded by means of a read channel into the original sequence of bits.

The purpose of the read channel is to process the weak recorded signal read by the read head so that a subsequent recovery of a digital signal representing the recorded information is possible. For this purpose, the recorded signal is customarily first prepared by amplification, filtering, compensation for linear distortion, amplitude control or the like. Thereafter, in order to determine the maximum amplitude of the recorded signal, the signal is differentiated and compared in a threshold value detector with a predetermined threshold value in order to recover a digital signal. The still coded digital signal is then decoded in a decoder to recover the original bit sequence.

In the known techniques, exceeding the threshold value is generally used as the determining criterion as to whether a pulse change has taken place or not. The disadvantages of the known techniques, which show themselves as falsely detected signal pulses become obvious when the signal to noise ratio decreases.

Since the error rate of data decoding varies with the signal to noise ratio, with increasing storage density, the criterion for recovery a digital from the recorded signal become more critical. Current storage devices show that if the signal to noise ratio decreases below the range of about 20 to 26 dB there is a substantial increase in the error rate. These errors can, within limits, be corrected with error correction procedures. However, this requires a substantial expenditure of time in the entire storage device and accordingly reduces the maximum achievable data throughput in comparison to the theoretically possible data throughput.

SUMMARY OF THE INVENTION

It is an object of the invention to improve the method and apparatus for recovery digital signals from recorded signals so that the error rate during signal recovery is minimized even if the signal to noise ratio is small.

The foregoing and other objects are accomplished by providing a method and apparatus in which the shape of the recorded signal is sensed, preferably by sensing the shape of a plurality of sections thereof. The sensed shaped of the recorded signal is compared with the shape of a stored "ideal" or normal read signal. The normal read signal is stored as a normal read signal comparison pattern of a plurality of voltages, each representing an adjacent section of the shape of the normal read signal. When the sections of the sensed signal are compared with like sections of the stored normal read signal comparison pattern a correlation factor is computed indicative of the level of correlation or agreement between the sensed and stored signals. If the correlation factor exceeds a threshold value the recorded signal is evaluated as a read pulse, otherwise the recorded signal is evaluated as a non-pulse.

An advantage of the invention is a substantially improved immunity against noise and other interfering signals. Thereby an improved data security and integrity can be realized.

With the invention it is possible to maintain a low error rate when recovering a digital signal from a recorded signal even if the signal to noise ratio is small. The use of the invention decreases the error rate so that the data throughput rate actually achieved and theoretically possible strongly approximate one another.

According to this invention, in contrast to the prior art which used the signal maximum amplitude as the determining criterion, the overall shape of the recorded signal is used to recognize a pulse change. As a further feature of the invention the comparison can be optimized by dynamically adjusting the shape of the stored normal read signal for particular data, media or read head characteristics.

Whereas in the known technique pulse changes in the recorded signal could only be safely determined if the signal to noise ratio was greater than 20 dB, with the invention pulses can accurately be converted even if the signal to noise ratio is as low as 3 dB.

DETAILED DESCRIPTION OF THE PREFERRED EMBODIMENT

Figure 1:
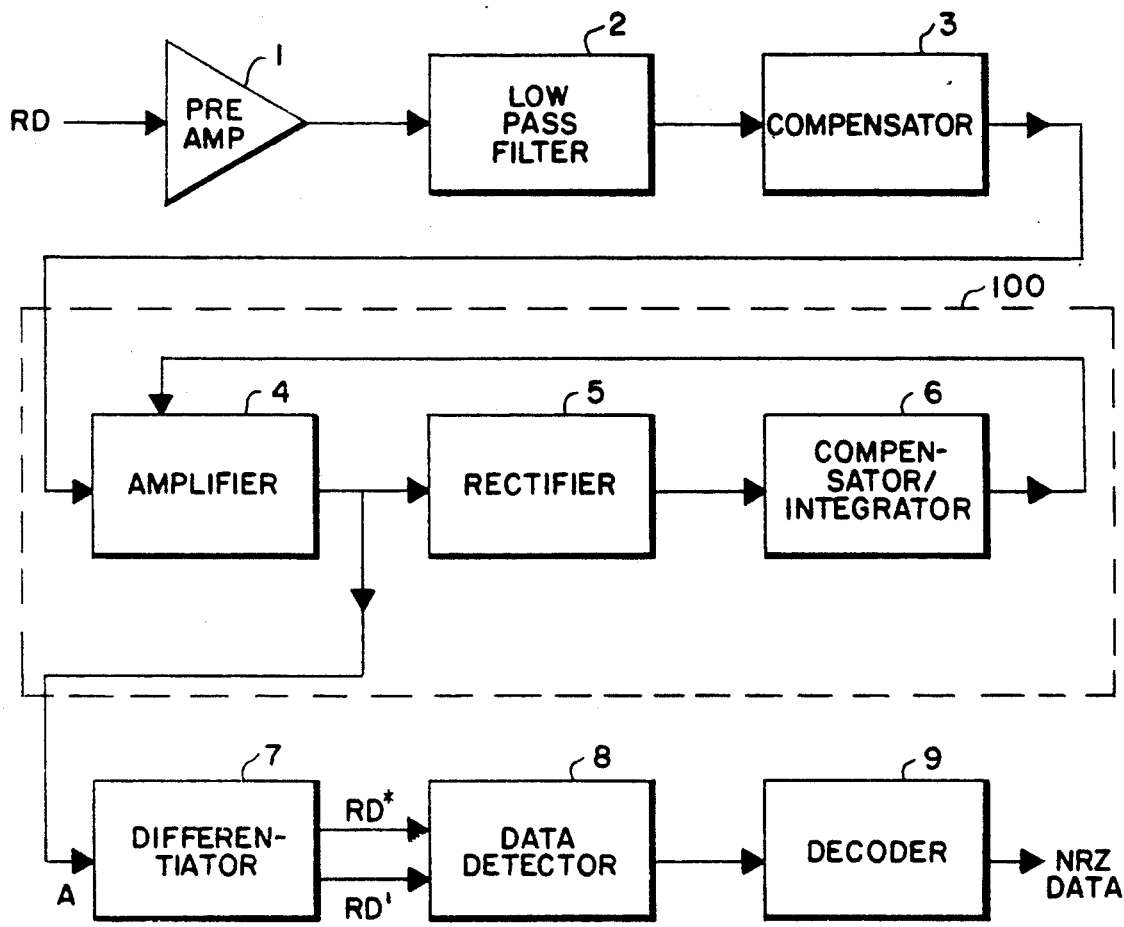
FIG. 1 is a generalized block digram of the circuit of a conventional read channel.

In FIG. 1 there is shown a generalized block diagram of a circuit of a conventional read channel of a storage device not shown. A recorded read signal RD rad by a read head, not shown, is input to a preamplifier 1. Therein the read signal RD is normally amplified to discernible but yet low voltage values. The output signal of the preamplifier 1 is input to a low pass filter 2 which filters out undesired high frequency interfering signals.

The output of the low pass filter is input to a compensator 3. In the compensator 3, linear distortion of the read signal RD, which is phase distorted on account of storage medium phenomena and electric characteristics such as packet run time distortion, are compensated.

The output signal of the compensator 3 is input to a control circuit, shown as a broken line block 100, for amplitude control of the read signal RD, wherein the control circuit 100 for amplitude control has one after the other a variable amplifier 4, a full wave rectifier 5 and a compensator/integrator 6. In the control circuit 100 the output signal of the compensator/integrator 6 is fed back to the variable amplifier 4.

Because of variability in the recording medium, the amplitude of the read signal RD can vary. Therefore, by means of the control circuit 100, the read signal RD amplitude is so controlled that the automatic amplification control circuit 100 provides as an output a constant amplitude analog signal A, which is input to a differentiator 7.

In the differentiator 7, the analog signal A is differentiated to determine the maximum amplitude of the analog signal, whereon at the output of the differentiator 7, the processed analog signal RD* and the differentiated analog signal RD' are represented as inputs to a data detector 8.

In the data detector 8, the differentiated analog signal RD' and optionally also the processed analog signal RD* are compared with a threshold value and converted into a digital signal. That is, the presence of a signal is interpreted as a logical "1" and the remainder or "no signal" is interpreted as a logical "0". The output of the data detector 8 is coupled as an input to a decoder 9. In the decoder 9 the digital signal is decoded into data, by way of example, NRZ (non-return-to-zero) data, which correspond to the original sequence of bits.

In the method according to the invention or in the circuit arrangement in accordance with the invention, in place of the differentiator 7 and the data detector 8, a signal correlator 10 is used. The generalized block diagram of the circuit of the signal correlator 10 in accordance with the invention is shown in FIG. 2.

The signal correlator 10 has an analog delay line 11, a correlator 12 and a comparison pattern storage device 13. The comparison pattern storage device 13 is coupled to a microprocessor 14.

Figure 2:
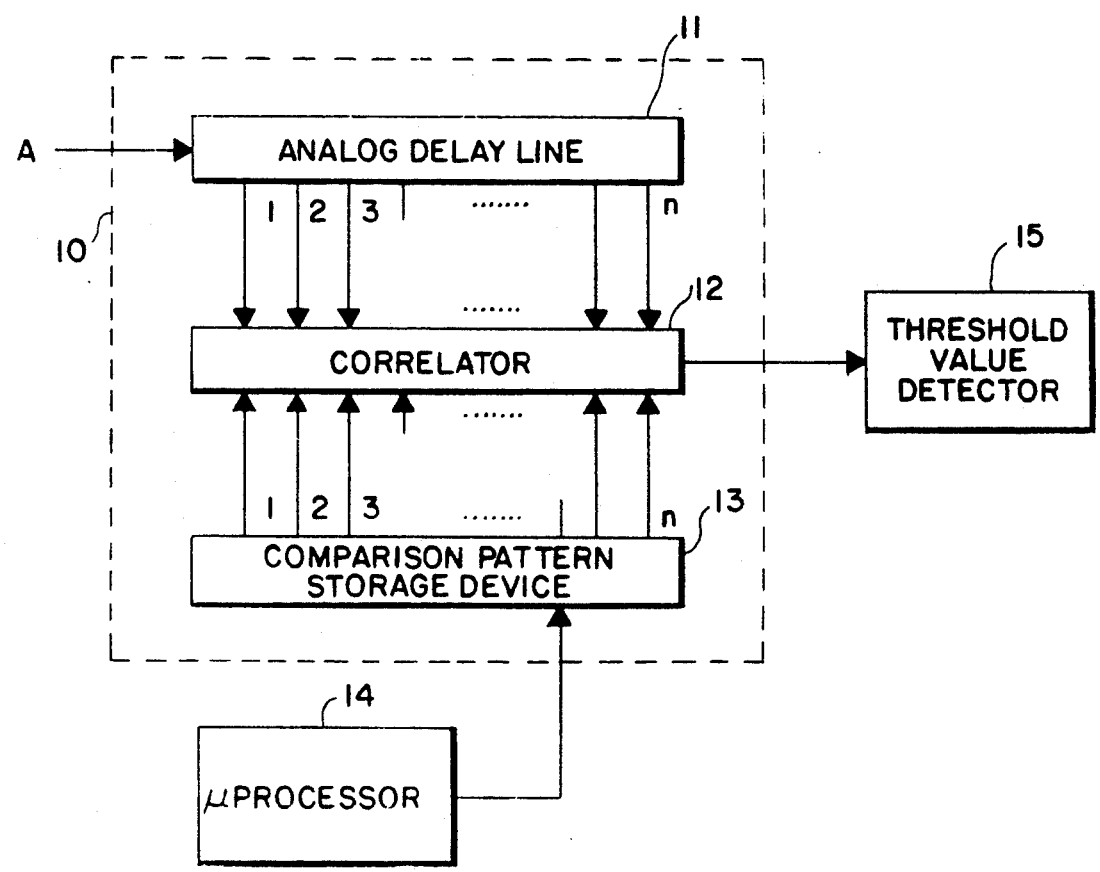
FIG. 2 is a generalized block diagram of the circuit of the signal correlator in accordance with the invention.

The output of the control circuit 100 for amplitude control of FIG. 1 is coupled as an input to the signal correlator 10 of FIG. 2. That is, the input to the analog delay line 11 is the constant amplitude analog signal A. The analog delay line 11 acts as a short term analog signal storage device for "storing" analog signal A. The function of the analog delay line 11 is thus similar to a shift register with serial input and parallel output with the exception that the process is continuous and requires no clock.

The analog signal A is transmitted continuously through the analog delay line 11. The analog delay line 11 has at equal time delay distances "n" taps, which hereinafter are simply called taps. By means of these taps, the condition or "shape" of the analog signal A can be simultaneously and continuously "sensed" at various points in time. The number of taps determines the accuracy and quality of the correlation of the system.

The total delay in the analog delay line 11 should preferably correspond to the width of a single read pulse, which normally is in the range of tens of nanoseconds.

The analog delay line 11 can be constructed as a transmission line in which a signal is delayed, by way of example, a 50 Ohm coaxial cable provides a delay of about 5 nanoseconds per meter.

Figure 3:
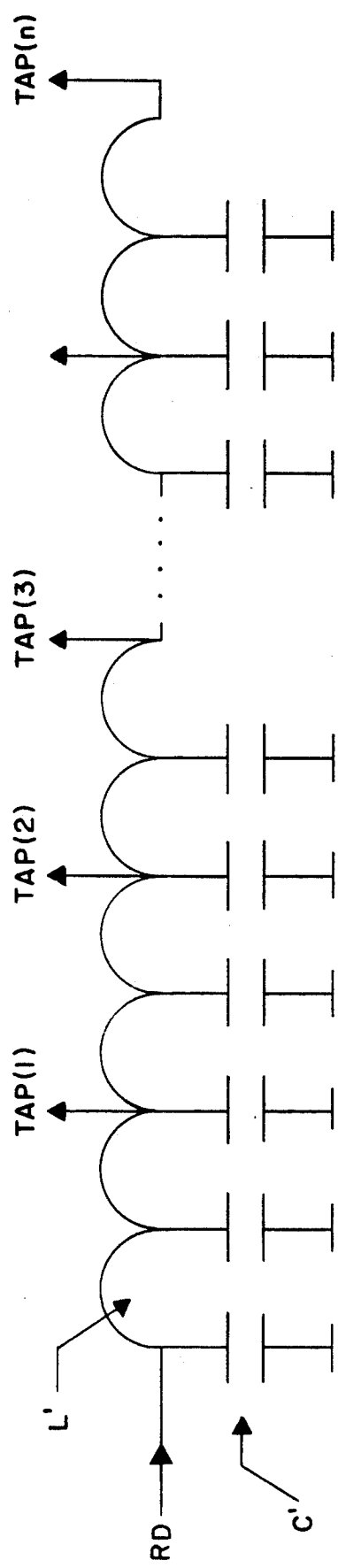
FIG. 3 is a generalized block diagram of the circuit of the analog delay line of the signal correlator of FIG. 2.

Alternatively, the analog delay line 11, can also be constructed as a delay line which consists essentially of an inductance with distributed capacity, as is shown in FIG. 3. This delay line has end taps and a capacitive layer on which are formed a plurality of capacitors, of which one electrode in each case is grounded and the other electrode of which is connected in each case with the delay line. Thereby the delay line has a distributed capacity C' and a distributed inductance L'. The input analog signal A is continuously transmitted through the delay line 11 and it can be tapped at various points in time. With such a delay line delays from 100 picoseconds to a microsecond are attainable.

Yet as an other alternative for the analog delay line 11, other analogous short term signal storage means can be used, such as, by way of example, amplifier stages, which, determined by capacitance and cut-out behavior of transistors likewise have a delay time, so that by a corresponding number of amplifier stages, a similar short term storage for the analog signal A can be achieved.

The signal correlator 10 in accordance with the invention is now described in more detail with reference to FIG. 4. In this embodiment, the analog delay line 11 has nine taps (n=9) where the signal R1 to R9 are removed or "sensed".

Figure 4:
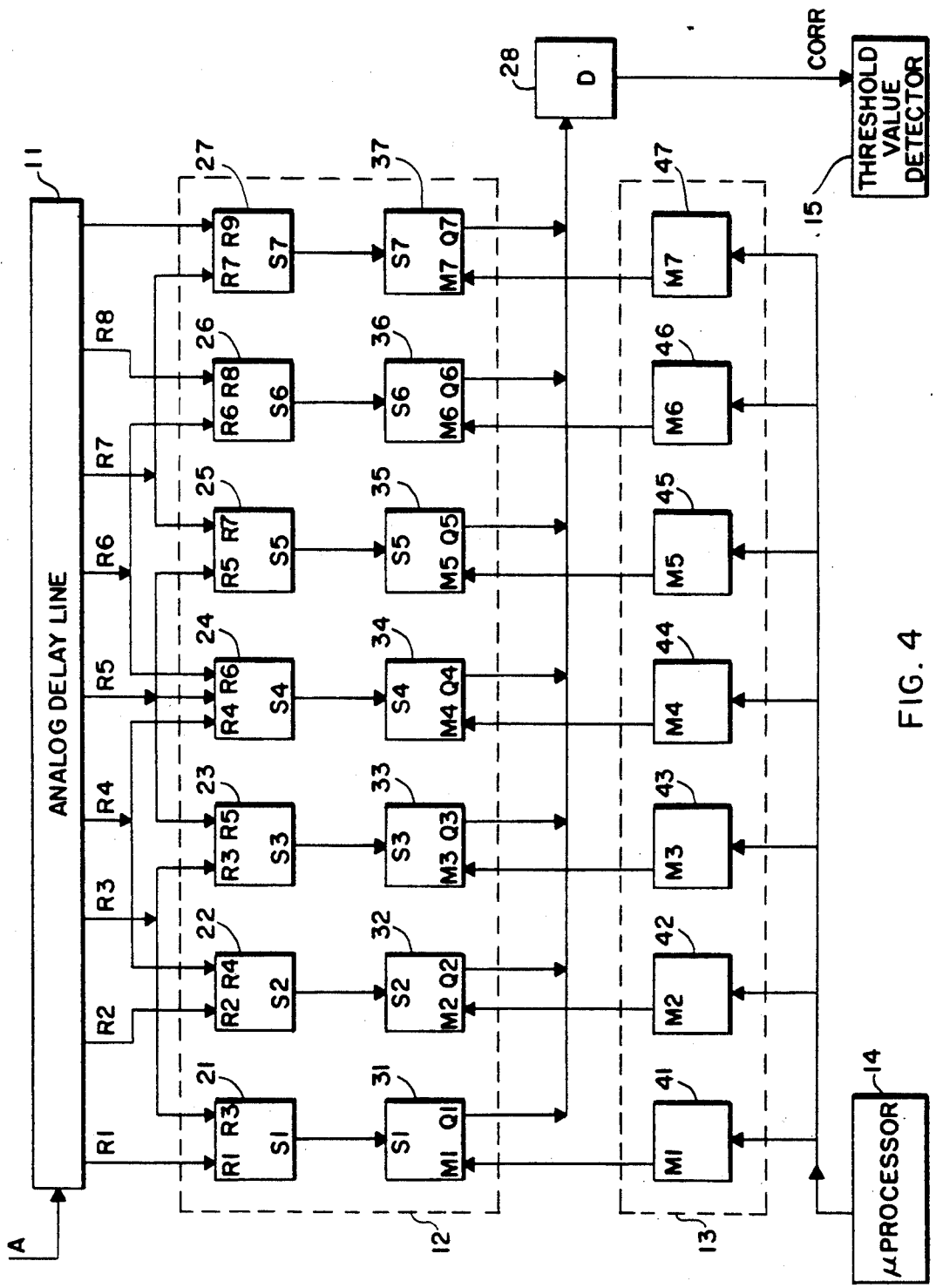
FIG. 4 is a generalized block diagram of the circuit of the signal correlator of FIG. 2 showing nine taps.

The correlator 12 has, in the embodiment shown in FIG. 4, seven adders, 21 to 27, as well as three dividers, 31 to 33, a comparator 34, and an additional three dividers, 35 to 37. The analog calculations necessary to perform the signal correlation, in each case, can be implemented by conventional analog circuits. The comparison pattern storage device 13 consists of seven voltage storage devices 41 to 47, each individually coupled to the microprocessor 14.

As explained above, the analog delay line 11 has nine taps at which, in each case, the signals R1 to R9 are sensed. The signal R1 is coupled to the first input of the adder 21 and the signal R2 is coupled to the first input of the adder 22. The signal R3 is coupled to the second input of adder 21 and the first input of adder 23. The signal R4 is coupled to the second input of adder 22 and the first input of adder 24. The signal R5 is coupled to the second input of adder 23, the second input of adder 24 and the first input of adder 25. The signal R6 is coupled to the third input of adder 24 and the first input of adder 26. The signal R7 is coupled to the second input of adder 25 and the first input of adder 27. The signal R8 is coupled to the second input of adder 26 and the signal R9 to the second input of adder 27.

The output signal S1 present at adder 21 is coupled to the divider 31, the signal S2 at the output of adder 22 to the divider 32 and the signal S3 present at the output of adder 23 to the divider 33. The signal S4 present at the output of adder 24 is coupled to the comparator 34. The signal S5 present at the output of adder 25 is coupled to the divider 35, the signal S6 present at the output of adder 26 is coupled to the divider 36 and the signal S7 present at the output of adder 27 is coupled to the divider 37.

As explained above, the comparison pattern storage device 13 has seven voltage storage devices 41 to 47 coupled to the microprocessor 14. The comparison pattern storage device 13 stores the shape of an "ideal" or normal read analog signal in the form of analog voltage values, which are fed to the voltage storage devices 41 to 47 from the microprocessor 14. The signal M1 present at the output of the voltage storage device 41 is coupled to the divider 31, the signal M2 present at the output of voltage storage device 42 is coupled to the divider 32, the signal M3 present at the output of voltage storage 43 is coupled to the divider 33, the signal M4 present at the output of voltage storage device 44 is coupled to the comparator 34, the signal M5 present at the output of voltage storage device 45 is coupled to divider 35, the signal M6 present at the output of voltage storage device 46 is coupled to the divider 36 and the signal M7 present at the output of voltage storage device 47 is coupled to the divider 37, as is evident from FIG. 4.

The correlator 10 has the object of comparing the sensed shape of the read analog signal A continuously transmitted through delay line 11 with the stored shape of the normal read analog signal stored as a comparison pattern of voltages in the comparison pattern storage device 13. In order to minimize the amplitude dependence of the analog signal A, the comparison between the shapes of the "sensed" and "stored" signals is done simultaneously in three separate regions, namely "rising", "maximum" and "falling".

For this purpose, voltage storage devices 41 to 43 contain voltage values M1, M2 and M3 of the "rising" region, the voltage storage device 44 contains the average maximum amplitude voltage M4 of the normal read signal in the "maximum" region, and the voltage storage devices 45 to 47 contain the voltage values M5 to M7 of the "falling" region.

For calculating the correlation in the "rising" region, the signals R1 to R5 tapped from the analog delay line 11 and the signals M1 to M3 present at the output of voltage storage devices 41 to 43 are used.

In the functional blocks shown in FIG. 4, the adders 21 to 23 calculate as intermediate values ($S_i$) the gradient of the slope of the "rising" region of the analog signal A as differences of voltages according to the following equation:

$$S_i = R_{i+2} - R_i \tag{1}$$

wherein i runs from 1 to 3 and the intermediate values ($S_i$), that is S1, S2 and S3, is present, in each case, at the outputs of adders 21 to 23 respectively. This means that at the output of adder 21, the intermediate result S1 is evaluated as R3−R1, at the output of adder 22 the intermediate result S2 is evaluated as R4−R2 and at the output of the adder 23 the intermediate result S3 is evaluated as R5−R3.

With the divider 31, divider 32 and divider 33, the absolute value of the individual correlations ($Q_i$) for the "rising" region are formed according to the following formula:

$$Q_i = |(S_i/M_i) - 1| \tag{2}$$

wherein i runs from 1 to 3 and the individual correlations ($Q_i$), that is Q1, Q2 and Q3, is present, in each case, at the outputs of dividers 31 to 33 respectively. In other words, at the output of divider 31 the intermediate result Q1 is evaluated as $|(S1/M1) - 1|$, at the output of divider 32 the intermediate result Q2 is evaluated as $|(S2/M2) - 1|$ and at the output of divider 33 the intermediate result Q3 is evaluated as $|(S3/M3) - 1|$. The signals M1, M2, M3 representing the voltage values in the "rising" region of the stored normal read comparison pattern are provided by voltage storage devices 41 to 43.

The calculation of the correlation in the "maximum" region takes place by a comparison of the signals R4, R5 and R6 with the signal M4 provided by voltage storage device 44. The arithmetic mean of the expected peak amplitude of the analog signal A, expressed as an intermediate value ($S_i$) is determined according to the following formula:

$$S_i = \tfrac{1}{3} \sum_{m=4}^{6} R_m \tag{3}$$

wherein i is 4 for the analog delay line 11 with 9 taps as in the example in FIG. 4.

In the comparator 34, the intermediate result ($S_i$), that is the output S4 of adder 24, is compared with the stored signal M4 provided by voltage storage device 44 according to the following equations to determine the individual weighted correlation:

$Q_i = 0$, if $S_i$ is equal to or greater than $c \times M_i$ $Q_i = n$, if $S_i$ is less than $c \times M_i$ \hfill (4)

wherein $i$ is 4 for the analog delay line 11 with 9 taps as in the example in FIG. 4, and wherein the intermediate result ($Q_i$), that is the individual correlation Q4, is the output signal of the comparator 34. The parameter c for the analog delay line 11 with 9 taps is in the range of about:

$$0.4 < c < 0.6 \tag{5}$$

and wherein the parameter c must correspondingly be changed with a higher number ("n") of taps.

With the exception of the sign, the calculation of the correlation in the "falling" region takes place in the same manner as in the "rising" region, that is, by comparing the sensed signals R5 to R9 with the stored voltages M5, M6, M7.

Thus, in adder 25, adder 26 and adder 27 the difference necessary for calculating the gradients of the slope in the falling region of the analog signal A accordingly are formed to equation (1), wherein i runs from 5 to 7. As an intermediate result at the output of the adder 25, the signal S5 is evaluated as R7−R5, at the output of the adder 26, the signal S6 is evaluated as R8−R6 and at the output of the adder 27, the signal S7 is evaluated as R9−R7.

Then, as for the "rising" region, the individual correlations are formed in accordance with equation (2), wherein i runs from 5 to 7. That is, signals Q5, Q6, Q7 present at the outputs of dividers 35 to 37 are the results of the comparison with the voltages M5, M6, M7 of voltage storage devices 45 to 47 representing the curve shape of a normal read analog signal in the "falling" region.

The output signals Q1 to Q7 are coupled to an adder 28 which at its output D determines the total correlation factor CORR as the arithmetic mean of the individual correlations ($Q_i$) according to the following formula:

$$\text{CORR} = \frac{1}{(n-2)} \sum_{i=1}^{n-2} Q_i \tag{6}$$

where n=9 as in the example illustrated in FIG. 4.

The output of the adder 28, representing the total correlation factor CORR is coupled to a threshold value detector 15. The object of the threshold value detector 15 is to present at its output a logical "1" in the form of a digitized signal only fi the total correlation factor CORR exceeds a predetermined threshold value. The threshold value necessary to indicate a logical "1"

is adjusted in accordance with system requirements depending on the allowable level of the signal to noise ratio.

Should, by way of example, a small signal to noise ratio be tolerated, then the total correlation factor CORR, which determines whether the output of the threshold value detector 15 is a logical "1", is chosen correspondingly high, e.g. at 0.8.

Because the shape of the normal read signal is input to the comparison pattern storage device 13 in the form of voltages from microprocessor 14, it is also possible to use adaptive techniques in order to achieve optimum efficiency. Thus it is possible, by iterative algorithms, to automatically determine the optimum voltages for the comparison pattern storage device 13 in an individual system by sampling calibration or test data on the storage medium. Thus, in particular, the voltage values in the comparison pattern storage device 13 representing an ideal curve shape, can be matched to the individual characteristics of the read head or storage medium.

Devices suitable for storing the normal read signal comparison pattern of voltages M1 to M7 are, in particular, digital/analog (D/A) converters. Thus, the microprocessor 14 can write the comparison pattern of voltages into the D/A converters and can, if appropriate, also be modified by the microprocessor 14 to optimize the comparison.

Advantageous embodiments of the invention are possible by one skilled in the art. Thus, by way of example an acceleration of the data throughput can be achieved by using multiple comparison pattern storage devices 13 to process the analog signals in parallel.

Having thus described an exemplary embodiment of the invention, it will be apparent that various alterations, modifications and improvements will readily occur to those skilled in the art. Such obvious alterations, modifications and improvements, though not expressly described above, are nonetheless intended to be implied and are within the spirit and scope of the invention. Accordingly, the foregoing discussion is intended to be illustrating only, and not limiting; the invention is limited and defined only by the following claims and equivalent thereto.

What is claimed is:

1. A method for recovering a digital signal having digital pulses from a recorded signal read from a storage medium by a read head of a storage device, said recorded signal being a reproduction of said digital pulses of said digital signal comprising the steps of:
    storing a normal read signal comparison pattern which corresponds to a normal read signal;
    sensing the shape of said recorded signal;
    comparing the sensed shape of said recorded signal with said stored normal read signal comparison pattern of said normal read signal;
    deriving the level of correlation between the sensed shape of said recorded signal and said stored normal read signal comparison pattern of said normal read signal; and
    evaluating said recorded signal as a digital pulse at a particular level of correlation and otherwise as a digital non-pulse.

2. The method according to claim 1 wherein said digital pulse is evaluated as logical "1" and said digital non-pulse as logical "0".

3. The method according to claim 2 wherein said normal read signal comparison pattern is divided into a plurality of sections, and said storing step further includes the steps of storing for each of said sections of said normal read signal comparison pattern storing a voltage in a voltage storage device, and wherein said recorded signal is likewise divided into a plurality of sections, and said sensing step further includes the steps of running said recorded signal continuously through a short term analog signal storage device, and for each of said sections of said recorded signal sensing a voltage at said short term analog signal storage device, and said comparing step further includes the steps of comparing for each of said sections of said normal read signal comparison pattern the stored voltage with the sensed voltage of like sections of said recorded signal running through said short term analog signal storage device.

4. The method according to claim 3 wherein
said plurality of sections of said normal read signal comparison pattern and like sections of said recorded signal re divided into three regions, namely
into a "rising" region, in which the respective stored and sensed voltages are rising,
into a "maximum" region in which the respective stored and sensed voltages are a maximum, and
into a "falling" region in which the respective stored and sensed voltages are falling, and
that in said rising and falling regions for determining the gradient of the slope of said recorded signal intermediate values ($S_i$) are formed according to the following equation:

$$S_i R_{i+2} - R_i$$

wherein $R_i$ are the sensed voltages of respective sections of said recorded signal and for respective sections of said normal read signal comparison pattern and like sections of said recorded signal the absolute valued individual correlations ($Q_i$) are derived according to the following equation:

$$Q_i = |(S_i/M_i) - 1|$$

wherein $M_i$ are the stored voltages at respective sections of said normal read signal comparison pattern, and
that in said maximum region for determining the maximum amplitude of said recorded signal the intermediate value ($S_i$) is formed from the arithmetic mean of the sensed voltages of respective sections of said recorded signal and for respective sections of said normal read signal comparison pattern and like sections of said recorded signal the weighted individual correlation $Q_i$ is derived according to the following equations:

$$Q_i = 0 \text{ if } S_i \text{ is equal to or greater than } c \times M_i$$

$$Q_i = n \text{ if } S_i \text{ is less than } c \times M_i$$

wherein $S_i$ and $M_i$ are the sensed and stored maximum voltage of respective section of said recorded signal and said normal read signal comparison pattern, c is chosen corresponding to the number ("n") of said plurality of sections of said recorded signal, and
that a total correlation factor is derived from the arithmetic mean of said individual correlations ($Q_i$) in said rising, maximum and falling regions, and that at a particular total correlation factor a digital pulse is emitted from a threshold value detector.

5. The method according to any of claims 1 to 4 wherein the correlation is adjusted correspondingly to a permitted signal to noise ratio.

6. The method according to claim 3 wherein the stored voltages for each of said sections of said normal read signal comparison pattern are provided from a microprocessor.

7. The method according to claim 6 wherein the values of the voltages of said normal read signal comparison pattern are matched by means of said microprocessor to the characteristics of said storage medium and said read head of said storage device.

8. The method according to any of the claim 1 wherein on a parallel working of a plurality of said recorded signals, a corresponding plurality of normal read signal comparison patterns are used.

9. An apparatus for recovering a digital signal having digital pulses from a recorded signal read from a storage medium by a read head of a storage device, said recorded signal being a reproduction of said digital signal comprising:
means for storing a normal read signal comparison pattern which corresponds to a normal read signal;
means coupled to said storage device for sensing said recorded signal;
means coupled to said storing means and said sensing means for comparing the sensed shape of said recorded signal with said stored normal read signal comparison pattern;
means coupled to said comparing means for deriving the level of correlation between the sensed shape of said recorded signal and said stored normal read signal comparison pattern; and
means coupled to said correlating mean for evaluating said recorded signal as a digital pulse at a particular level of correlation and otherwise as a digital non-pulse.

10. The apparatus according to claim 9 wherein said sensing means includes an analog delay line for providing short term signal storage for said recorded signal.

11. The apparatus according to claim 10 wherein said analog delay line is selected from the group of a transmission line, an inductance line with distributed capacity, and a plurality of amplifier stages.

12. The apparatus according to any of claim 10 wherein
said normal read signal comparison pattern is divided into a plurality of sections and for each of said sections a voltage is stored in a means for storing a voltage,
said recorded signal is likewise divided into a plurality of sections and for each of said sections a voltage is continuously sensed by a means for sensing a voltage;
said comparing means and said correlating means are divided into a plurality of comparators and correlators for comparing and correlating each of said sections of said recorded signal with a like section of said normal read signal comparison pattern.

13. The apparatus according to claim 12 further including
a microprocessor, coupled to said means for storing a voltage for generating voltages corresponding to said normal read signal comparison pattern.

14. The apparatus according to claim 13 wherein said microprocessor matches said voltages stored as said normal read signal comparison pattern to the characteristics of said storage medium and said read head of said storage device.

* * * * *